United States Patent
Yano

(10) Patent No.: US 8,977,000 B2
(45) Date of Patent: Mar. 10, 2015

(54) OBJECT DETECTION SYSTEM AND METHOD THEREFOR

(75) Inventor: Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 13/427,124

(22) Filed: Mar. 22, 2012

(65) Prior Publication Data

US 2012/0250939 A1 Oct. 4, 2012

(30) Foreign Application Priority Data

Mar. 30, 2011 (JP) ................................. 2011-076479

(51) Int. Cl.
- *G06K 9/00* (2006.01)
- *H04N 7/18* (2006.01)
- *G06K 9/68* (2006.01)

(52) U.S. Cl.
CPC .......... *G06K 9/00362* (2013.01); *G06K 9/6857* (2013.01)
USPC ............................ 382/103; 348/143; 348/152

(58) Field of Classification Search
None
See application file for complete search history.

(56) References Cited

U.S. PATENT DOCUMENTS

| | | | |
|---|---|---|---|
| 6,456,321 B1 * | 9/2002 | Ito et al. .......................... | 348/143 |
| 6,618,074 B1 * | 9/2003 | Seeley et al. ................... | 348/143 |
| 7,283,161 B2 * | 10/2007 | Someya et al. ............. | 348/211.9 |
| 7,482,569 B2 * | 1/2009 | Shibao ........................ | 250/208.1 |
| 8,115,812 B2 * | 2/2012 | Yoshida et al. ............... | 348/159 |
| 8,204,273 B2 * | 6/2012 | Chambers et al. ............. | 382/103 |
| 8,218,025 B2 * | 7/2012 | Yonaha ....................... | 348/222.1 |
| 8,284,992 B2 * | 10/2012 | Takamori et al. ............ | 382/103 |
| 2005/0123201 A1 * | 6/2005 | Nakashima et al. .......... | 382/195 |
| 2005/0163346 A1 * | 7/2005 | van den Bergen et al. ... | 382/103 |
| 2007/0110321 A1 * | 5/2007 | Okada et al. .................. | 382/209 |
| 2009/0219391 A1 * | 9/2009 | McLeish et al. .............. | 348/143 |
| 2009/0263021 A1 * | 10/2009 | Takamori et al. ............ | 382/181 |
| 2010/0026802 A1 * | 2/2010 | Titus et al. .................... | 348/143 |
| 2010/0284568 A1 * | 11/2010 | Tojo .............................. | 382/103 |
| 2011/0063441 A1 * | 3/2011 | Asa et al. ...................... | 348/143 |
| 2012/0194676 A1 * | 8/2012 | Laganiere et al. ............ | 348/143 |

OTHER PUBLICATIONS

Porikli, Fatih, and Oncel Tuzel. "Object tracking in low-frame-rate video." Electronic Imaging 2005. International Society for Optics and Photonics, 2005.*

(Continued)

*Primary Examiner* — Stephen R Koziol
*Assistant Examiner* — Sean Conner
(74) *Attorney, Agent, or Firm* — Canon USA, Inc., IP Division

(57) ABSTRACT

In an object detection system with a first and a second image processing apparatus, the first image processing apparatus includes a reduction unit configured to reduce an input image, a first detection unit configured to detect a predetermined object from a reduction image reduced by the reduction unit, and a transmission unit configured to transmit the input image and a first detection result detected by the first detection unit to the second image processing apparatus, and the second image processing apparatus includes a reception unit configured to receive the input image and the first detection result from the first image processing apparatus, a second detection unit configured to detect the predetermined object from the input image, and an output unit configured to output the first detection result and a second detection result detected by the second detection unit.

6 Claims, 6 Drawing Sheets

(56) References Cited

OTHER PUBLICATIONS

Hengstler, Stephan, et al. "MeshEye: a hybrid-resolution smart camera mote for applications in distributed intelligent surveillance." Proceedings of the 6th international conference on Information processing in sensor networks. ACM, 2007.*

Hu, Weiming, et al. "A survey on visual surveillance of object motion and behaviors." Systems, Man, and Cybernetics, Part C: Applications and Reviews, IEEE Transactions on 34.3 (2004): 334-352.*

Collins, Robert T., et al. "Algorithms for cooperative multisensor surveillance." Proceedings of the IEEE 89.10 (2001): 1456-1477.*

Histograms of Oriented Gradients for Human Detection, Proceedings of the IEEE Conference on Computer Vision and Pattern Recognition(CVPR2005).

Qiang Zhu et al, "Fast human detection using a cascade of Histograms of Oriented Gradients", Proceedings of the IEEE Conference on Computer Vision and Pattern Recognition (CVPR2006).

* cited by examiner

OBJECT DETECTION SYSTEM AND METHOD THEREFOR

BACKGROUND OF THE INVENTION

1. Field of the Invention

The present invention relates to a system for detecting an object from an image and a method therefor.

2. Description of the Related Art

In recent years, there has been a system which detects a person from an image captured by a monitoring camera to use the result of detection to detect an intruder, monitor the action of the intruder, and monitor degree of congestion of persons. A method for detecting a person applicable to such a system has been discussed (refer to Dalal and Triggs, "Histograms of Oriented Gradients for Human Detection," Proceedings of the IEEE Conference on Computer Vision and Pattern Recognition (VPR2005), (Document 1)). This method extracts a histogram in the gradient direction of a pixel value from an image to determine whether a partial area in the image is a person using the histogram as a feature quantity.

Other than that, there has been discussed a method for detecting a human body at a high speed such that AdaBoost learning is performed handling the feature amount used in the Document 1 as a weak discriminator, and a cascade discriminator is executed based on the AdaBoost learning (refer to Qiang Zhu et al, "Fast human detection using a cascade of Histograms of Oriented Gradients," Proceedings of the IEEE Conference on Computer Vision and Pattern Recognition (CVPR2006), (Document 2)).

On the other hand, as to the monitoring camera it is desired to detect a small person in the distance, so that an image is increased in resolution.

However, the detection of a small person from a high-resolution image enormously increases throughput, which increases time for processing one frame among monitoring images. This causes a problem that a person quickly moves in a screen cannot be detected.

SUMMARY OF THE INVENTION

The present invention enables the detection of a small object and the detection of an object moving at a high speed at the same time.

According to an aspect of the present invention, an object detection system is provided with a first and a second image processing apparatus. The first image processing apparatus includes a reduction unit configured to reduce an input image, a first detection unit configured to detect a predetermined object from a reduction image reduced by the reduction unit, and a transmission unit configured to transmit the input image and a first detection result detected by the first detection unit to the second image processing apparatus. The second image processing apparatus includes a reception unit configured to receive the input image and the first detection result from the first image processing apparatus, a second detection unit configured to detect the predetermined object from the input image, and an output unit configured to output the first detection result and a second detection result detected by the second detection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
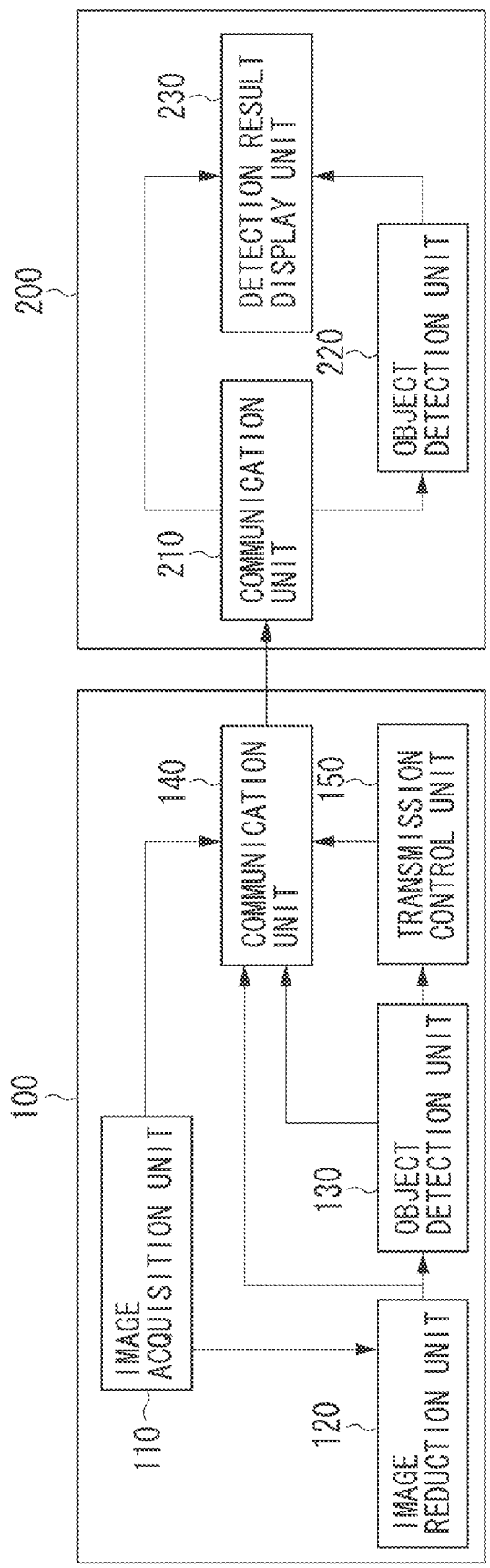
FIG. 1 is a block diagram illustrating an example of configuration of an object detection system.

FIG. 1 is a block diagram illustrating an example of configuration of an object detection system according to the present exemplary embodiment. A first and a second object detection apparatus 100 and 200 include similar object detection functions.

For example, the first object detection apparatus 100 is a monitoring camera with an object detection function. The second object detection apparatus 200 is a monitoring apparatus with an object detection function. The first and the second object detection apparatus 100 and 200 are communicably connected to each other via a network.

The first object detection apparatus 100 includes an image acquisition unit 110, an image reduction unit 120, an object detection unit 130, a communication unit 140, and a transmission control unit 150. The second object detection apparatus 200 includes a communication unit 210, an object detection unit 220, and a detection result display unit 230.

The image acquisition unit 110 acquires image data captured by an image capturing unit such as a camera. The image acquisition unit 110 can acquire image data of full high-definition (HD) (1920×1080 pixels) in real time (30 frames per second), for example. The image reduction unit 120 reduces the image data acquired by the image acquisition unit 110 to image data multiplied by any demagnifying factor and stores the reduced image data in an internal memory.

The object detection unit 130 detects a predetermined object from the image data stored in the internal memory of the image reduction unit 120. The object detection unit 130 includes a built-in processor and a system memory, for example, and executes an object detection program.

In the present exemplary embodiment, the object detection unit 130 executes a human body detection program which is discussed in Documents 1 and 2 as software to detect a human body (a human-body portion) from the image data. Other than that, the object detection unit 130 may be configured to execute the parallel processing or the pipeline processing using a plurality of the built-in processors, or a part or the whole of processing of the object detection program may be configured using a dedicated hardware.

The communication unit 140 transmits the image data acquired by the image acquisition unit 110 or the image data stored in the internal memory of the image reduction unit 120. More specifically, the communication unit 140 temporarily stores the image data in the internal memory, attaches supplementary information in conformity with a predetermined communication protocol to the stored image data and transmits the image data via an interface. Similarly, the communication unit 140 transmits the detection result of the object detection unit 130.

The transmission control unit 150 controls data that the communication unit 140 transmits to the outside of the first object detection apparatus 100 according to the detection result of the object detection unit 130.

The communication unit 210 receives the image data and the detection result transmitted from the first object detection apparatus 100 via the interface and stores the image data and the detection result in the internal memory.

The object detection unit 220 detects a predetermined object from the image data stored in the internal memory of the communication unit 210. The object detection unit 220 is similar in configuration to the object detection unit 130. However, it is desirable for the object detection units 130 and 220 to be configured by a processor with optimum processing capacity according to the throughput.

The detection result display unit 230 generates image data for display from the reception data stored in the internal memory of the communication unit 210 and the detection result of the object detection unit 220. The detection result display unit 230 outputs the generated image data via the interface to the outside. If the object detection unit 220 is connected to a display apparatus such as a cathode ray tube (CRT), the output image data are displayed on the display apparatus.

The operation of the first and second object detection apparatuses 100 and 200 is briefly described below. The first object detection apparatus 100 transmits the acquired image data to the second object detection apparatus 200 at a low frame rate. The first object detection apparatus 100 reduces the acquired image data to the ones multiplied by a predetermined factor at a high frame rate and detects an object from the reduced image data.

The second object detection apparatus 200, on the other hand, detects an object from the image data with a high resolution acquired from the first object detection apparatus 100. The results detected by the first and second object detection apparatuses 100 and 200 are integrated by the second object detection apparatus 200 and output.

The operation of the first and second object detection apparatuses 100 and 200 is described in order with reference to the drawings.

Figure 2:
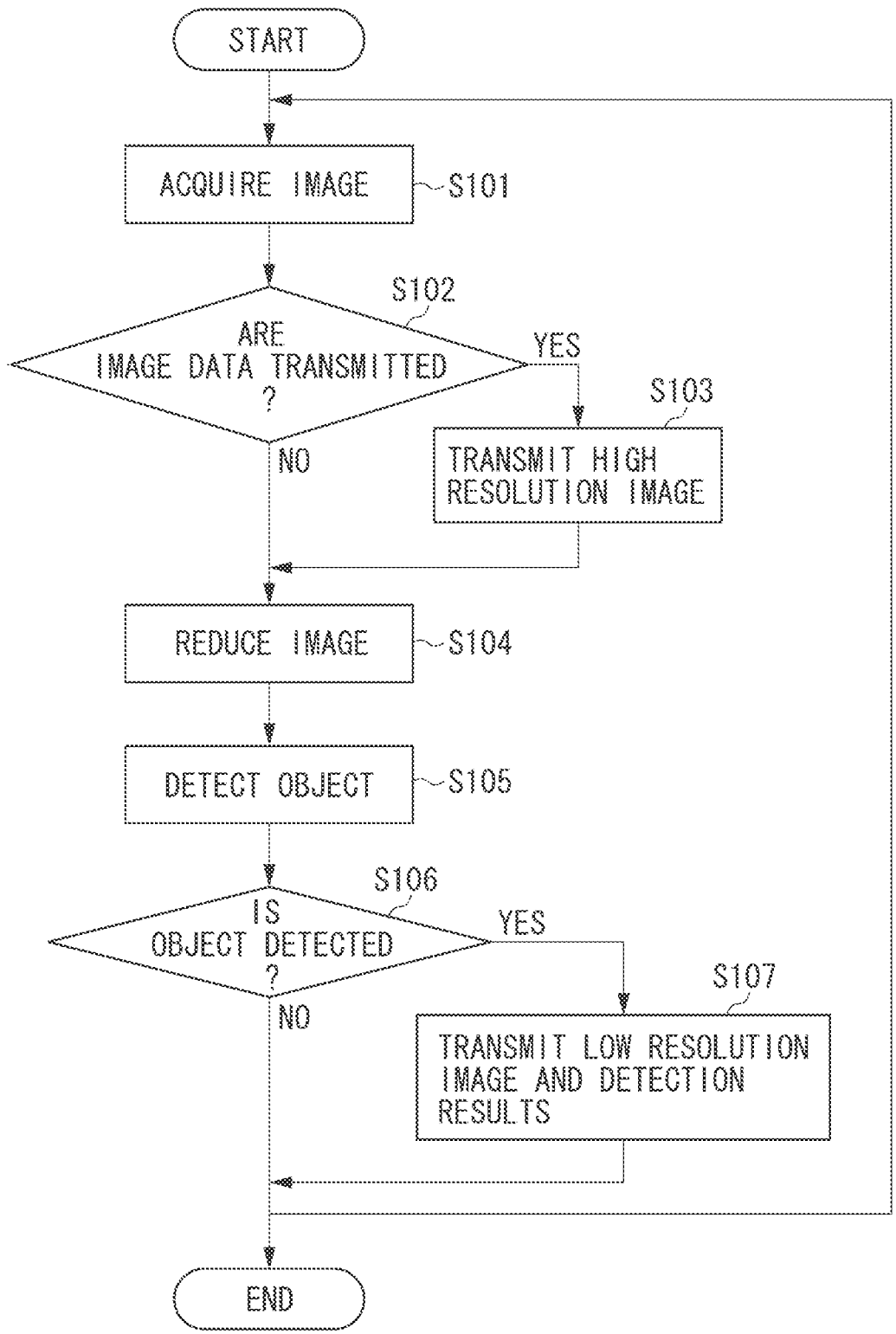
FIG. 2 illustrates an example of a flow chart according to a first object detection process.

The operation of the first object detection apparatus 100 is described according to a flow chart in FIG. 2. FIG. 2 illustrates an example of a flow chart according to a first object detection process.

In step S101, the image acquisition unit 110 acquires the image data captured by an image capturing unit. The acquired image data are temporarily stored in the internal memory of the image acquisition unit 110 as the image data of full HD (1920×1080 pixels). The frame rate at which the image data is acquired is 30 frames per second.

The transmission control unit 150 controls the communication unit 140 to transmit the image data stored in the internal memory of the image acquisition unit 110. For example, in step S102, the transmission control unit 150 determines whether to transmit the image data. If the transmission control unit 150 determines to transmit the image data (YES, in step S102), a process in step S103 is performed. If the transmission control unit 150 determines not to transmit the image data (NO, in step S102), a process in step S104 is performed. A broadband communication pathway is required to transmit the image data of full HD at 30 frames per second, so that the transmission control unit 150 controls the communication unit 140 to transmit the image data at a predetermined interval. For example, the transmission control unit 150 controls the communication unit 140 to transmit the image data of full HD at one frame per second.

In step S103, the communication unit 140 transmits the image data (high resolution images) stored in the internal memory of the image acquisition unit 110 in response to instructions from the transmission control unit 150. At this point, the communication unit 140 stores the image data temporarily acquired by the image acquisition unit 110 in the internal memory of the communication unit 140. The communication unit 140 attaches supplementary information in conformity with a predetermined communication protocol to the stored image data and transmits the image data via the interface.

In step S104, the image reduction unit 120 reduces the image data stored in the internal memory of the image acquisition unit 110 to the ones multiplied by a predetermined factor and stores the reduced image data in the internal memory. For example, the image data are reduced to the ones with 480×270 pixels which are a quarter in size in the horizontal and vertical direction. The image reduction unit 120 reduces the image data by simply thinning of pixels. Herein, all frames are reduced so that the process at the succeeding stage is performed at a frame rate acquired by the image acquisition unit 110.

In step S105, the object detection unit 130 detects a human body from the image data stored in the internal memory of the image reduction unit 120. For example, a human body detection program in which the method proposed in Document 2 is implemented as a software is executed. In the method proposed in Document 2, a search window of a 64×128 pixels in size is set to perform the human detection. The image data input to the object detection unit 130 are sequentially reduced to the ones multiplied by the predetermined factor and detection is carried out to allow detecting a human body with 64×128 pixels or more in size.

The detection results are data representing the position coordinate and the size of the detected human body area and are temporarily stored in the internal memory of the object detection unit 130. A process time required for detecting a human body depends on the input image data. If the process is not ended in 1/30 second per frame, the object detection unit 130 interrupts the process.

In step S106, the transmission control unit 150 controls the communication unit 140 to transmit detection results according to the detection results of the object detection unit 130 and the image data detected and processed. For example, the transmission control unit 150 determines whether the object detection unit 130 detects a human body from an input frame.

If the object detection unit 130 detects the human body from the input frame (YES in step S106), the transmission control unit 150 causes the communication unit 140 to transmit detection results stored in the internal memory of the object detection unit 130. Furthermore, the transmission control unit 150 causes the communication unit 140 to transmit the image data (reduced image data) processed in the object detection unit 130 and stored in the internal memory of the image reduction unit 120. If the object detection unit 130 does not detect the human body from the input frame (NO in step S106), the transmission control unit 150 does not instruct the communication unit 140 to perform transmission.

In step S107, the communication unit 140 transmits the detection results and the reduced image data (low resolution image) in response to instructions of the transmission control unit 150. At this point, the communication unit 140 stores the detection results temporarily stored in the internal memory of the object detection unit 130 and the reduced image data stored in the internal memory of the image reduction unit 120, in the internal memory of the communication unit 140. The communication unit 140 attaches supplementary information in conformity with a predetermined communication protocol to the stored detection results and reduced image data and transmits them via the interface.

The processes from steps S101 to S107 are controlled by a control unit (not illustrated) to be sequentially repeated for each frame of the acquired image data.

Figure 3:
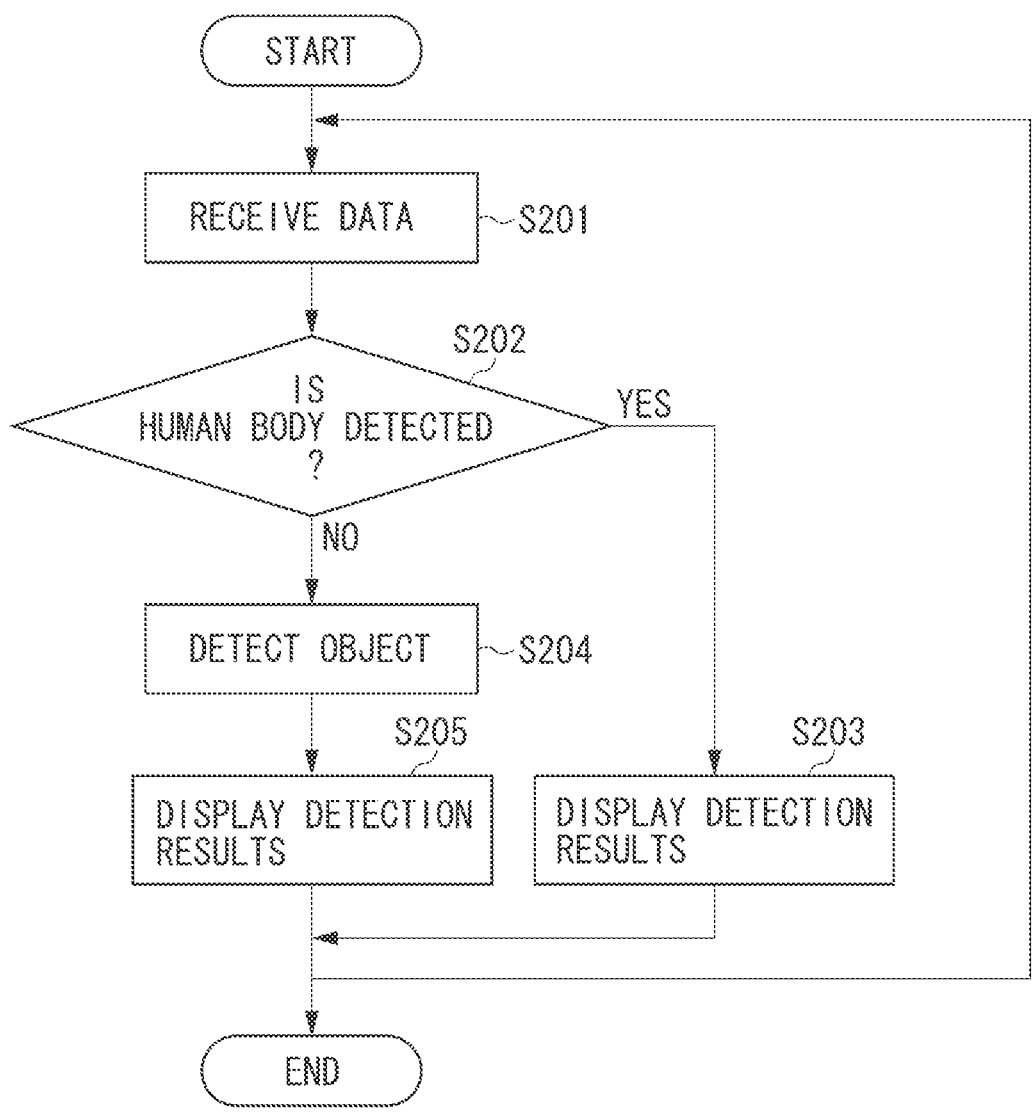
FIG. 3 illustrates an example of a flow chart according to a second detection process.

The operation of the second object detection apparatus 200 is described below according to a flow chart of FIG. 3. FIG. 3 illustrates an example of a flow chart related to a second object detection process.

In step S201, the communication unit 210 receives the data transmitted from the first object detection apparatus 100 via the interface.

In step S202, the communication unit 210 analyses the supplementary information from the received data according to the predetermined communication protocol. More specifically, the communication unit 210 acquires the image data and the detection results acquired by the first object detection apparatus 100 according to the analysis results and temporarily stores the image data and the detection results in the internal memory of the communication unit 210.

If the first object detection apparatus 100 transmits data in step S103, the communication unit 210 receives high-resolution image data acquired by the first object detection apparatus 100 and stores the image data in the internal memory.

If the first object detection apparatus 100 transmits data in step S107, on the other hand, the communication unit 210 receives the low-resolution image data acquired and reduced by the first object detection apparatus 100 and the detection results and stores the image data and the detection results in the internal memory.

For example, the communication unit 210 determines whether a human body is detected (presence or absence of a detection result). If the communication unit 210 determines that the human body is detected (YES in step S202), the process in step S203 is performed. If the communication unit 210 determines that the human body is not detected (NO in step S202), the process in step S204 is performed.

In other words, in step S203, if the communication unit 210 receives the detection results, the detection result display unit 230 generates image data for display from the low-resolution image data and the detection results stored in the internal memory of the communication unit 210. For example, the detection result display unit 230 analyses the detection results to generate the image data for display in which a rectangular frame (a detection result frame) indicating the detected human-body area is superimposed on the low-resolution image data reduced by the first object detection apparatus 100. The detection result display unit 230 converts the generated image data to data which can be displayed on the display apparatus and outputs the data to the outside via the interface.

In step S204, if the communication unit 210 does not receive the detection results, the object detection unit 220 detects a human body from the high-resolution image data stored in the internal memory of the communication unit 210. The process similar to that in the object detection unit 130 of the first object detection apparatus 100 is performed here. However, the detection process of low-resolution image data (480×270 pixels or less) is already performed by the first object detection apparatus 100 when the image data are sequentially reduced and detected, so that the process is skipped. The detection results are temporarily stored in the internal memory of the object detection unit 220. If the object detection unit 220 finishes the process, the object detection unit 220 notifies the detection result display unit 230 that the process is finished.

In step S205, if the detection result display unit 230 is notified by the object detection unit 220 that the process is finished, the detection result display unit 230 generates the image data for display from the high-resolution image data stored in the internal memory of the communication unit 210 and the detection results of the object detection unit 220.

For example, the detection result display unit 230 reduces the high-resolution image data stored in the internal memory of the communication unit 210. The detection result display unit 230 generates the image data for display in which a rectangular frame (a detection result frame) indicating the detected human-body area is superimposed on the reduced image data. The detection result display unit 230 converts the generated image data to data which can be displayed on the display apparatus and outputs the data to the outside via the interface.

The processes from steps S201 to S205 are controlled by a control unit (not illustrated) to be sequentially repeated according to the communication unit 210 receiving data.

An example of operation of the entire system based on the operation of the first and second object detection apparatuses 100 and 200 is described below using examples of a plurality of scenes captured by the monitoring camera of the first object detection apparatus 100.

If the monitoring camera captures a scene where a person does not exist at normal times, the second object detection apparatus 200 displays only the image data in step S205 based on the high-resolution image data with a low frame rate transmitted by the first object detection apparatus 100 in step S103.

If the monitoring camera captures a person appearing small in the distance, the second object detection apparatus 200 detects a person in step S204 from the high-resolution image data with a low frame rate transmitted by the first object detection apparatus 100 in step S103. The second object detection apparatus 200 displays an image in which the detection result frame is superimposed on the image of the monitoring camera in step S205.

If the monitoring camera captures a person appearing large at a short distance, the first object detection apparatus 100 detects the person in step S105. The first object detection apparatus 100 transmits the low-resolution image data with a high frame rate and the detection results in step S107. The second object detection apparatus 200 displays an image in which the detection result frame is superimposed on the image of the monitoring camera in step S203.

As described above, the first object detection apparatus 100 detects an object moving at a high speed (an example of a specified object) from low-resolution image data with a high frame rate. The second object detection apparatus 200 detects a small object (an example of a specified object) from the high-resolution image data with a low frame rate. According to the present exemplary embodiment, therefore, the detection of a small object can be compatible with the detection of an object moving at a high speed.

In the present exemplary embodiment, if the object detection unit 130 detects a human body, the reduced image data stored in the image reduction unit 120 are transmitted, however, the resolution of transmitted image data may be varied (determined) according to the size of the detected object.

For example, if the detected human body appears large, the low-resolution image data in which the reduced image data are further reduced are transmitted. If the detected human body is small, the reduced image data which are processed by the object detection unit 130 are transmitted.

In a second exemplary embodiment, there is described below an example realizing the similar effect in which the first object detection apparatus 100 detects an object from the high-resolution image data and the second object detection apparatus 200 detects an object from the low-resolution image data. In the present exemplary embodiment, the contents described in the first exemplary embodiment are omitted appropriately from description herein.

Figure 4:
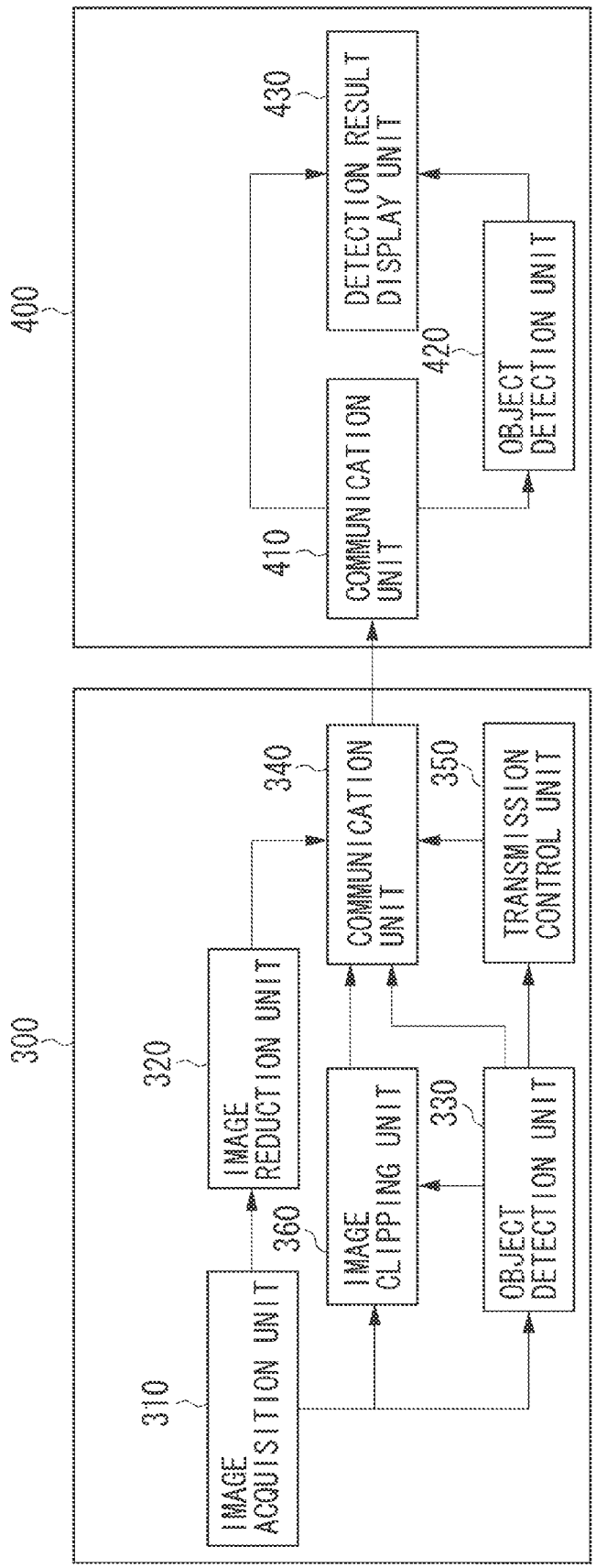
FIG. 4 is a block diagram illustrating an example of configuration of an object detection system.

FIG. 4 is a block diagram illustrating an example of configuration of an object detection system according to the present exemplary embodiment. A first and a second object detection apparatus 100 and 200 include similar object detection functions. As illustrated in FIG. 4, the first object detection apparatus 300 includes an image acquisition unit 310, an image reduction unit 320, an object detection unit 330, a communication unit 340, a transmission control unit 350, and an image clipping unit 360.

The image acquisition unit 310, the image reduction unit 320, the object detection unit 330, the communication unit 340, and the transmission control unit 350 are similar in function to the image acquisition unit 110, the image reduction unit 120, the object detection unit 130, the communication unit 140, and the transmission control unit 150 in the first exemplary embodiment respectively.

The image clipping unit 360 clips any partial area from the image data acquired by the image acquisition unit 310 and stores the area in an internal memory.

The second object detection apparatus 400 includes a communication unit 410, an object detection unit 420, and a detection result display unit 430. The communication unit 410, the object detection unit 420, and the detection result display unit 430 are similar in function to the communication unit 210, the object detection unit 220, and the detection result display unit 230 in the first exemplary embodiment respectively.

The operation of the first and second object detection apparatuses 300 and 400 is briefly described below.

The first object detection apparatus 300 transmits the reduced image data of the acquired image data at a high frame rate to the second object detection apparatus 400. The first object detection apparatus 300 detects an object from the acquired high-resolution image data.

The second object detection apparatus 400 detects an object from the low-resolution image data acquired from the first object detection apparatus 300. The results detected by the first and second object detection apparatuses 300 and 400 are integrated by the second object detection apparatus 400 and are output.

The operation of the first and second object detection apparatuses 300 and 400 is described in order with reference to the drawings.

Figure 5:
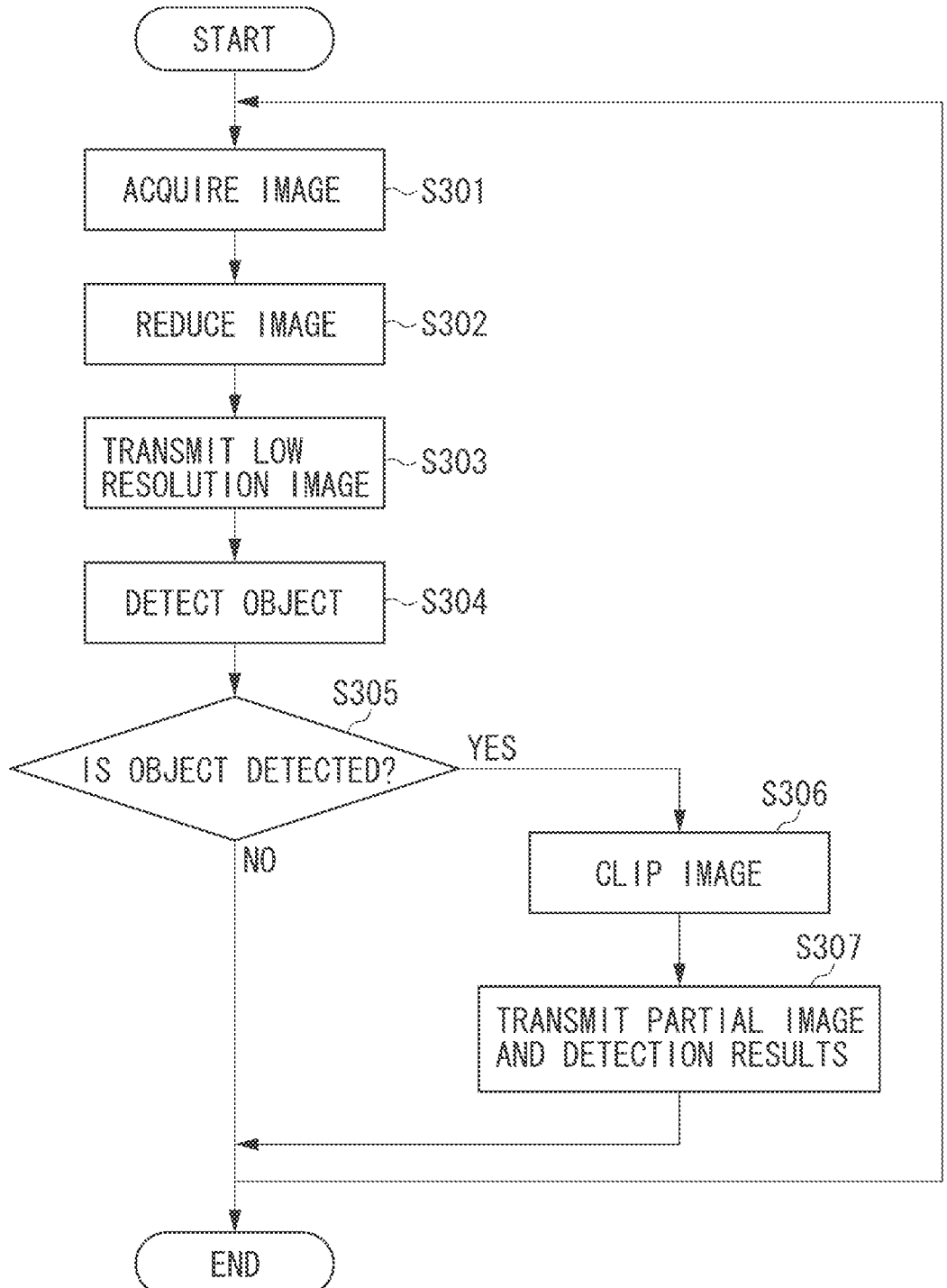
FIG. 5 illustrates an example of a flow chart according to a first object detection process.

FIG. 5 illustrates an example of a flow chart according to a first object detection process in the first object detection apparatuses 300.

In step S301, the image acquisition unit 310 acquires the image data captured by an image capturing unit. The image acquisition unit 310 acquires image data of full HD (1920× 1080 pixels) at 30 frames per second and temporarily stores the image data in the internal memory of the image acquisition unit 310. In step S302, the image reduction unit 320 reduces the image data of the image acquisition unit 310 to the one multiplied by the predetermined factor and stores the reduced image data in the internal memory thereof.

In step S303, the communication unit 340 transmits the reduced image data stored in the internal memory of the image reduction unit 320. The communication unit 340 transmits the image data for each frame in synchronization with a cycle at which the image acquisition unit 310 acquires the image data. If the bandwidth of a communication path is narrow, the size of an image to be reduced in step S302 is reduced to the one at which image data can be transmitted for each frame and the image data are transmitted in step S303.

In step S304, the object detection unit 330 detects a human body from the image data in the image acquisition unit 310. The process similar to that carried out in the object detection unit 220 of the second object detection apparatus 200 in the first exemplary embodiment is performed here. In other words, the process for detecting an object from a high resolution portion of the input image is performed. However, the detection process is continued until the process for all search windows is finished.

A control unit which is not illustrated controls the process of the image clipping unit 360 according to the detection results of the object detection unit 330. In step S305, the transmission control unit 350 controls the communication unit 340 to transmit the detection results according to the detection results of the object detection unit 330 and the image data clipped by the image clipping unit 360. For example, the control unit determines whether a human body is detected. If the control unit determines that the human body is detected (YES in step S305), the process in step S306 is performed. If the control unit determines that the human body is not detected (NO in step S305), the process is ended.

In step S306, if the object detection unit 330 detects the human body, the image clipping unit 360 clips the partial image data of a partial image including the area of the human body detected by the object detection unit 330 from the image data stored in the internal memory of the image acquisition unit 310. In other words, the image clipping unit 360 clips the partial image data from the image data in the image acquisition unit 310 according to the position of the human body detected by the object detection unit 330.

The image clipping unit 360 may clip the partial image data with a desired resolution from the image data in the image acquisition unit 310 according to the size of the human body detected by the object detection unit 330. For example, if the detected human body appears large, the image clipping unit 360 reduces the image data and clips the partial image data from the low-resolution image data.

In step S307, the communication unit 340 transmits the detection results of the object detection unit 330 and the image data clipped by the image clipping unit 360.

The processes from steps S301 to S307 are controlled by the control unit (not illustrated) to be sequentially repeated for each frame of the acquired image data. The process for detecting the human body in step S304 is skipped if the process in the preceding frame is not ended.

Figure 6:
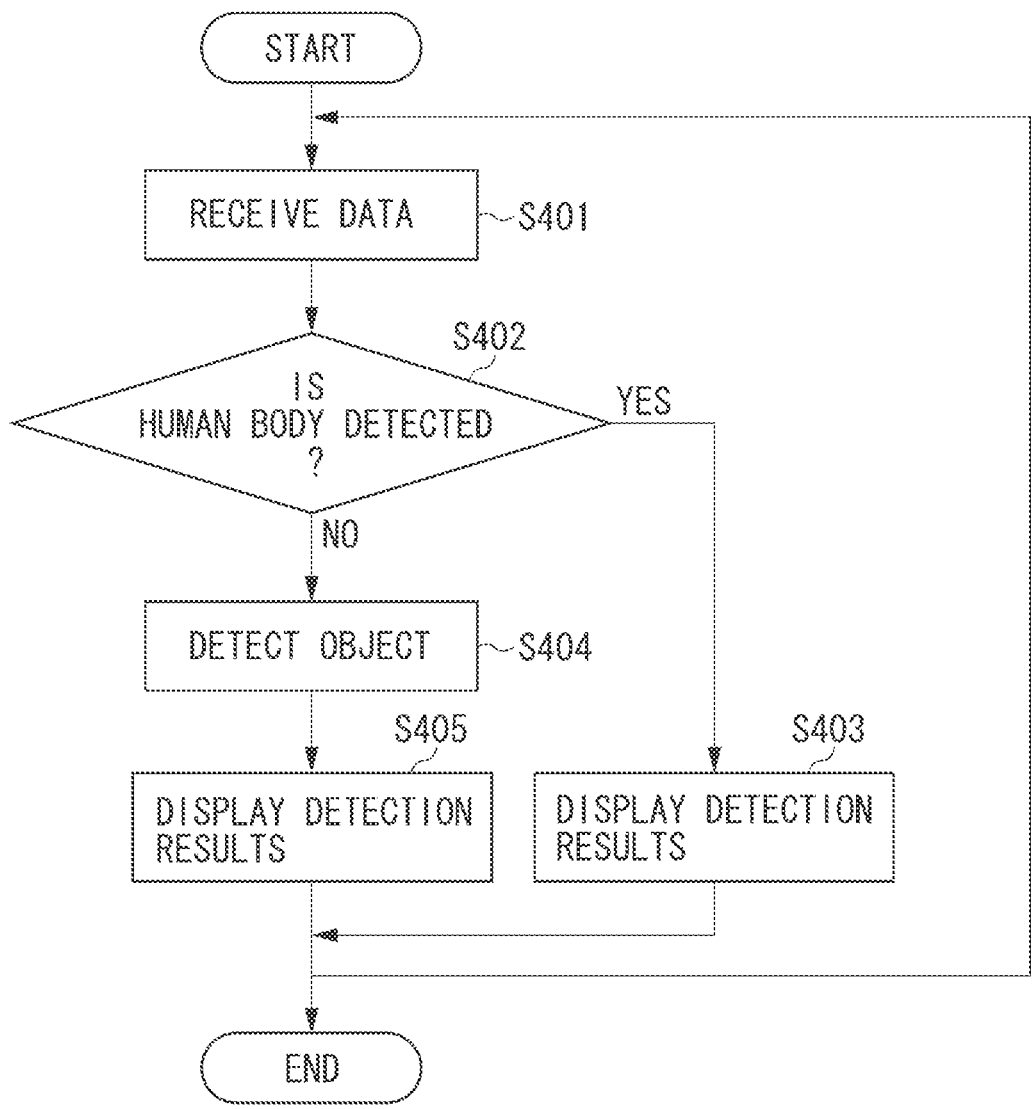
FIG. 6 illustrates an example of a flow chart according to a second detection process.

FIG. 6 illustrates an example of a flow chart according to a second object detection process in the second object detection apparatuses 400.

In step S401, the communication unit 410 receives the data transmitted from the first object detection apparatus 300 via the interface.

In step S402, the communication unit 410 analyses the supplementary information from the received data according to the predetermined communication protocol. More specifically, the communication unit 410 acquires the image data and the detection results acquired by the first object detection apparatus 300 according to the analysis results and temporarily stores the image data and the detection results in the internal memory of the communication unit 410.

If the first object detection apparatus 300 transmits data in step S303, the communication unit 410 receives low-resolution image data acquired and reduced by the first object detection apparatus 300 and stores the image data in the internal memory.

If the first object detection apparatus 300 transmits data in step S307, on the other hand, the communication unit 410 receives the partial image data and the detection results acquired and clipped by the first object detection apparatus 300 and stores the image data and the detection results in the internal memory.

For example, the communication unit 410 determines whether a human body is detected (presence or absence of a detection result). If the communication unit 410 determines that the human body is detected (YES in step S402), the process in step S403 is performed. If the communication unit 210 determines that the human body is not detected (NO in step S402), the process in step S404 is performed.

In other words, in step S403, if the communication unit 410 receives the detection results, the detection result display unit 430 generates image data for display from the partial image data and the detection results stored in the internal memory of the communication unit 410.

For example, the detection result display unit 430 analyses the detection results and superimposes a rectangular frame indicating the detected human-body area on the low-resolution image data reduced by the first object detection apparatus 300. The superimposed image data are reduced image data transmitted by the first object detection apparatus 300 in step S303. For example, the detection result display unit 430 synthesizes the image data to display the partial image together with the image on which the rectangular frame is superimposed.

In step S404, if the communication unit 410 does not receive the detection results, the object detection unit 420 detects a human body from the low-resolution image data.

In step S405, if the detection result display unit 430 is notified by the object detection unit 420 that the process is finished, the detection result display unit 430 generates the image data for display from the image data and the detection results of the object detection unit 420. In other words, the detection result display unit 430 analyses the detection results and generates the image data for display in which a rectangular frame indicating the detected human-body area is superimposed on the reduced image data.

The processes from steps S401 to S405 are controlled by the control unit (not illustrated) to be sequentially repeated according to the communication unit 410 receiving data.

An example of operation of the entire system based on the operation of the first and second object detection apparatuses 300 and 400 is described below using examples of a plurality of scenes captured by the monitoring camera of the first object detection apparatus 300.

If the monitoring camera captures a scene where a person does not exist at normal times, the second object detection apparatus 400 displays only the image data in step S405 based on the low-resolution image data with a high frame rate transmitted by the first object detection apparatus 300 in step S303.

If the monitoring camera captures a small person in the distance, the first object detection apparatus 300 detects a person in step S304. The first object detection apparatus 300 transmits the partial image data clipped in step S306 and the detection results in step S307. The second object detection apparatus 400 superimposes the detection result frame on the low-resolution image received in step S401 and displays a high-resolution partial image together with the superimposed image.

If the monitoring camera captures a person appearing large at a short distance, the second object detection apparatus 400 detects the person in step S404 from the low-resolution image data with a high frame rate transmitted by the first object detection apparatus 300 in step S303. The second object detection apparatus 400 displays the image in which the detection result frame is superimposed on the image of the monitoring camera in step S405.

As described above, the first object detection apparatus 300 detects a small (an example of a specified object) from high-resolution image data with a low frame rate. The second object detection apparatus 400 detects an object moving at a high speed (an example of a specified object) from the low-resolution image data with a high frame rate.

According to the present exemplary embodiment, therefore, the detection of a small object can be compatible with the detection of an object moving at a high speed.

Other Embodiments

In the first and second exemplary embodiments, a human body is taken as an example of an object detected by an object detection apparatus, however, the above configuration can be applied to a case where a face or a vehicle is detected.

Each of the first and second object detection apparatuses 100 and 200 may be a monitoring camera or a monitoring apparatus incorporating an information processing apparatus (computer) including a central processing unit (CPU), a read only memory (ROM), a random access memory (RAM), and a hard disk. In this case, basically, a program stored in the ROM and the hard disk is loaded on the RAM and executed by the CPU to realize the function of each object detection apparatus and the process according to the flow chart.

The function of each object detection apparatus and a part or all of the process according to the flow chart may be configured using a dedicated hardware.

The first and second object detection apparatuses 100 and 200 may be an integrated object detection apparatus.

The present invention can also be realized by executing the process in which software (program) realizing the functions of the above exemplary embodiments is supplied to a system or an apparatus via a network or various types of storage media and the computer (or CPU or microprocessor unit (MPU)) of the system or the apparatus reads and executes the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-076479 filed Mar. 30, 2011, which is hereby incorporated by reference herein in its entirety.

What is claimed is:

1. An object detection system including a first and a second image processing apparatus: wherein
the first image processing apparatus comprises:
a reduction unit configured to reduce each frame image of an input moving image input at a first frame rate;
a first detection unit configured to detect a predetermined object from each reduced frame image obtained by the reduction unit to obtain a first detection result of detecting the predetermined object from a low resolution input moving image with a high frame rate; and a transmission unit configured to transmit the input moving image at a second frame rate lower than the first frame rate and the first detection result from the low resolution input moving image with the high frame rate to the second image processing apparatus; and the second image processing apparatus comprises;

a reception unit configured to receive the input moving image transmitted at the second frame rate and the first detection result from the low resolution input moving image with the high frame rate from the first image processing apparatus;

a second detection unit configured to detect the predetermined object from each frame image of the input moving image received at the second frame rate to obtain a second detection result of detecting the predetermined object from a high resolution input moving image with a low frame rate; and an output unit configured to output the first detection result from the low resolution input moving image of the high frame rate and the second detection result from the high resolution input moving image with the low frame rate.

2. The object detection system according to claim 1, wherein the first and second detection units detect the predetermined object by sequentially reducing an image so that the resolution of the reduced image does not coincide.

3. An object detection method in an object detection system including a first and a second image processing apparatus, comprising:

in the first image processing apparatus, reducing each frame image of an input moving image input at a first frame rate to a reduction image;

detecting a predetermined object from each reduced frame image obtained by the reducing step to obtain a first detection result of detecting the predetermined object from a low resolution input moving image with a high frame rate; and transmitting the input moving image at a second frame rate lower than the first frame rate and the first detection result from the low resolution input moving image with the high frame rate to the second image processing apparatus; and in the second image processing apparatus, receiving the input moving image transmitted at the second frame rate and the first detection result from the low resolution input moving image with the high frame rate from the first image processing apparatus;

detecting the predetermined object from each frame image of the input moving image received at the second frame rate to obtain a second detection result of detecting the predetermined object from a high resolution input moving image with a low frame rate; and outputting the first detection result form the low resolution input moving image of the high frame rate and the second detection result from the high resolution input moving image with the low frame rate.

4. An object detection system including a first and a second image processing apparatus: wherein the first image processing apparatus comprises:

an acquisition unit configured to acquire an input moving image input at a first frame rate;

a first detection unit configured to detect a predetermined object from an each frame image extracted from the input moving image at a second frame rate lower than the first frame rate to obtain a first detection result of detecting the predetermined object from a high resolution input moving image with a low frame rate;

a reduction unit configured to reduce each frame image of the input moving image input at the first frame rate; and a transmission unit configured to transmit a reduced moving image obtained by the reduction unit at the first frame rate and the first detection result from the high resolution input moving image with the low frame rate to the second image processing apparatus; and the second image processing apparatus comprises;

a reception unit configured to receive the reduced moving image transmitted at the first frame rate and the first detection result from the high resolution input moving image with the low frame rate from the first image processing apparatus;

a second detection unit configured to detect the predetermined object from each frame image of the reduced moving image received at the first frame rate to obtain a second detection result of detecting the predetermined object from a low resolution input moving image with a high frame rate; and an output unit configured to output the first detection result from the high resolution input moving image of the low frame rate and the second detection result from the low resolution input moving image with the high frame rate.

5. The object detection system according to claim 4, wherein the first detection unit clips a partial image including the predetermined object from the input image if the first detection unit detects the predetermined object from the input image, the transmission unit transmits the partial image together with the first detection result to the second image processing apparatus, and the output unit outputs the partial image together with the first detection result.

6. An object detection method in an object detection system including a first and a second image processing apparatus, comprising:

in the first image processing apparatus, acquiring an input moving image input at a first frame rate;

detecting a predetermined object from each frame image extracted from the input moving image at a second frame rate lower than the first frame rate to obtain a first detection result of detecting the predetermined object from a high resolution input moving image with a low frame rate;

reducing each frame image of the input moving image input at the first frame rate to a reduction image; and transmitting a reduced moving image obtained by the reducing step at the first frame rate and the first detection result from the high resolution input moving image with the low frame rate to the second image processing apparatus; and in the second image processing apparatus, receiving the reduced moving image transmitted at the first frame rate and the first detection result from the high resolution input moving image with the low frame rate from the first image processing apparatus;

detecting the predetermined object from each frame image of the reduced moving image received at the first frame rate to obtain a second detection result of detecting the predetermined object from a low resolution input moving image with a high frame rate; and outputting the first detection result form the low resolution input moving image of the high frame rate and the second detection result from the high resolution input moving image with the low frame rate.

* * * * *